P. J. BRYAN.
MEAT CUTTING MACHINE.
APPLICATION FILED JUNE 23, 1911.
1,130,664.
Patented Mar. 2, 1915.
3 SHEETS—SHEET 1.
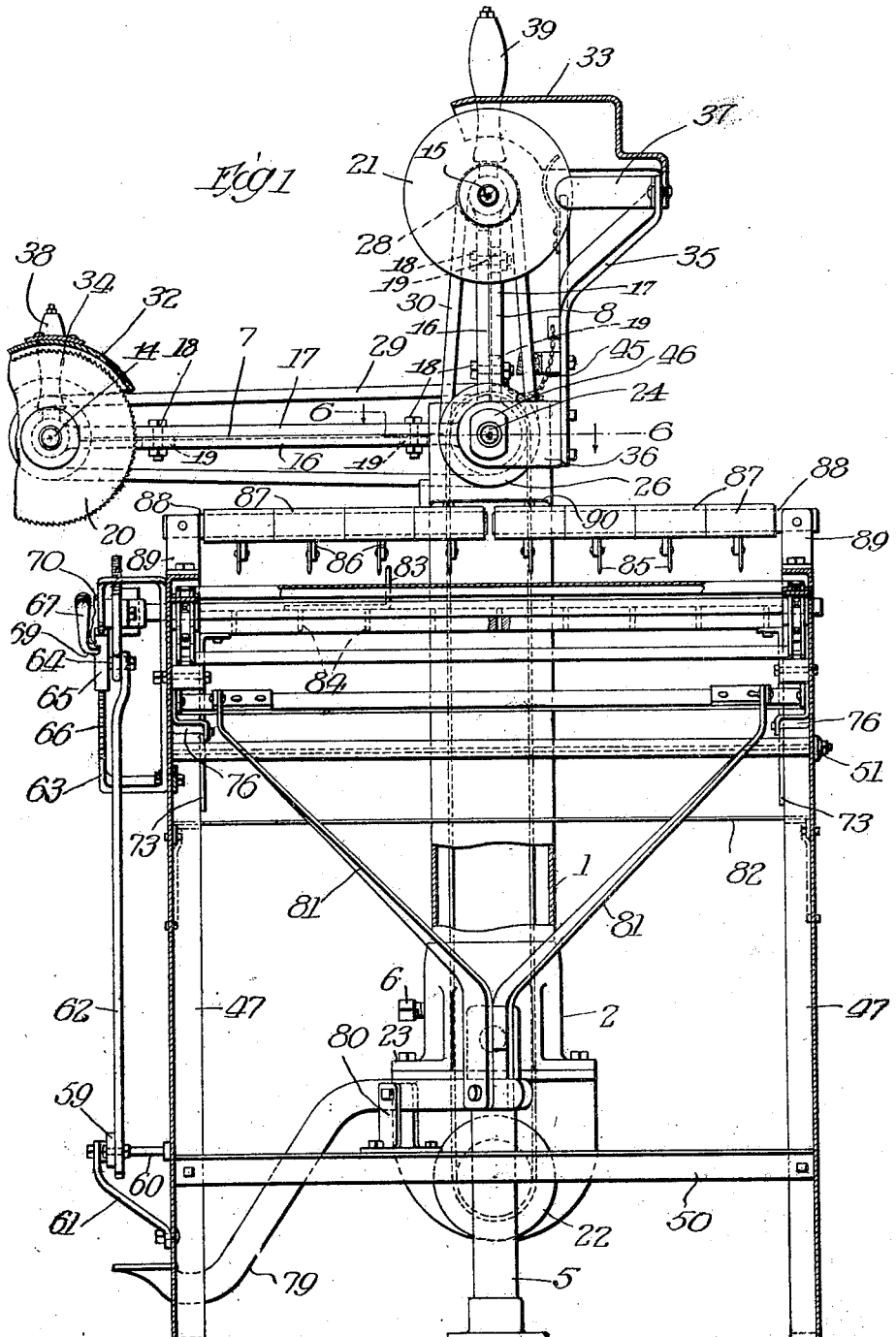

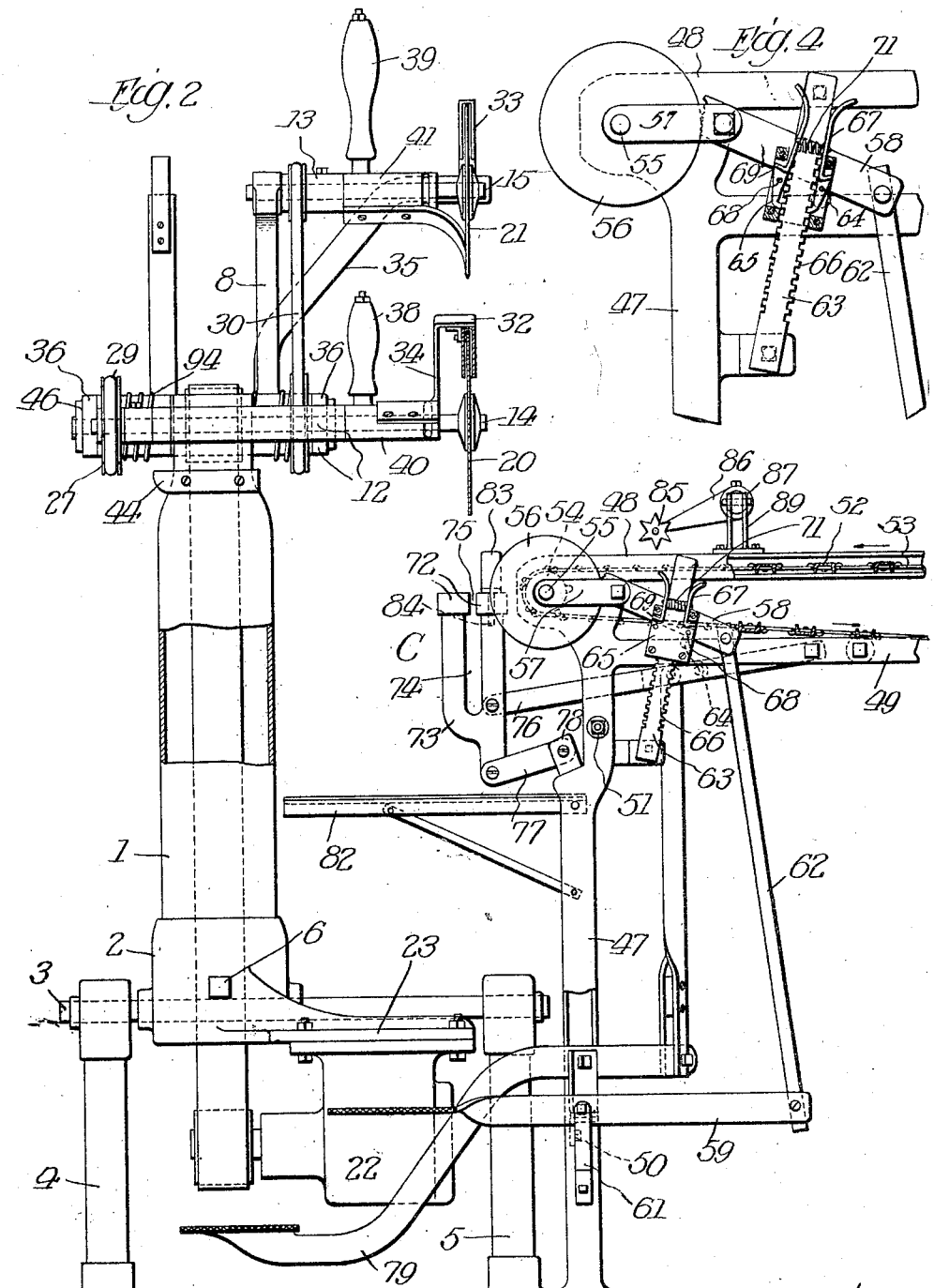

P. J. BRYAN.
MEAT CUTTING MACHINE.
APPLICATION FILED JUNE 23, 1911.
1,130,664.
Patented Mar. 2, 1915.
3 SHEETS—SHEET 3.
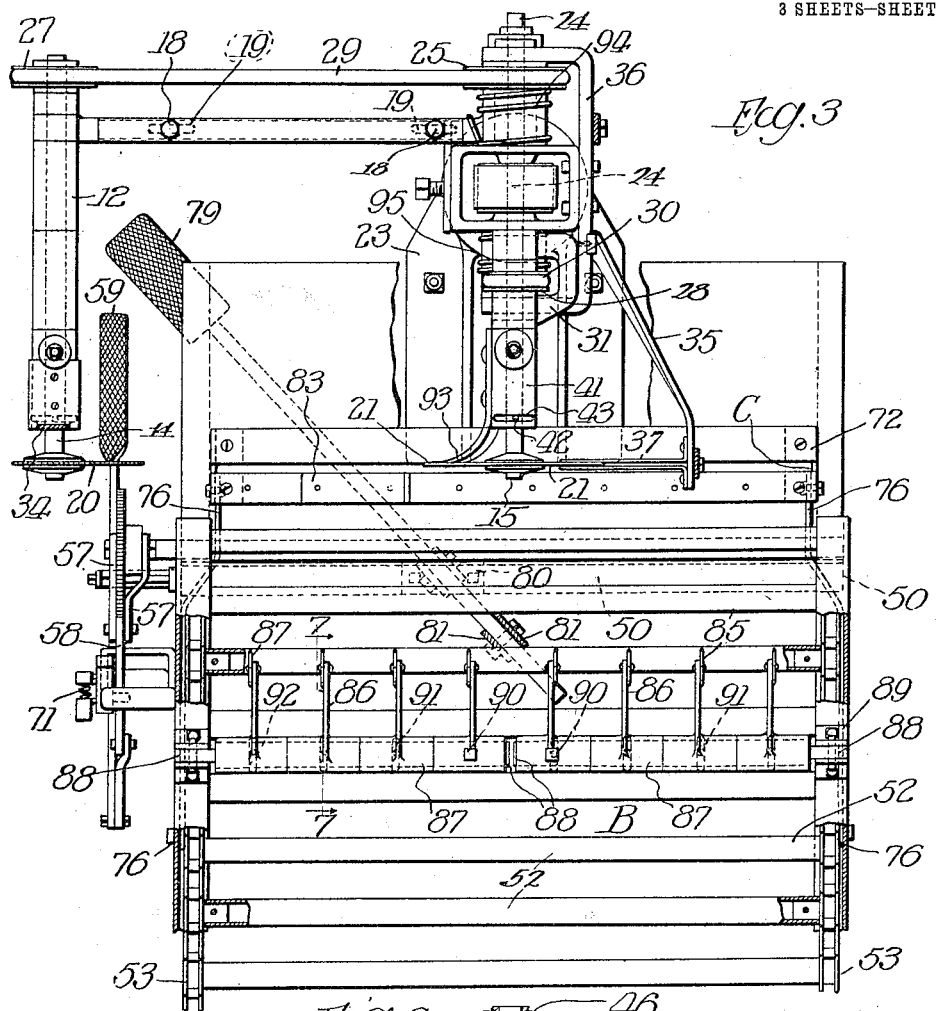
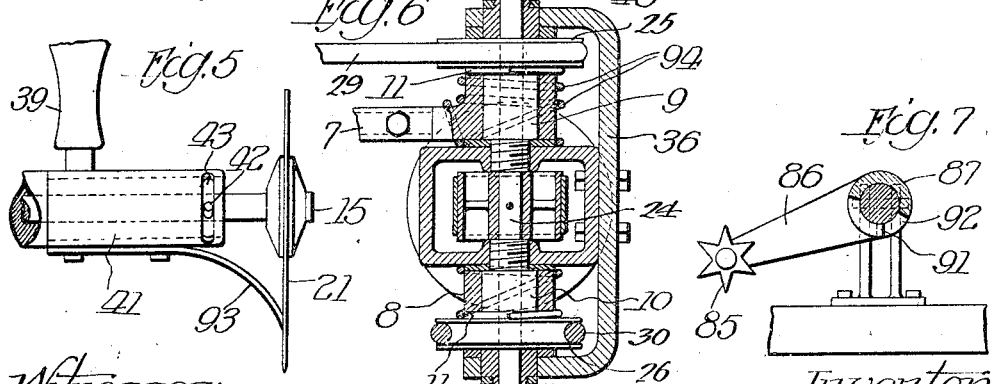
Witnesses:
N. G. Barrett
K. A. Costello
Inventor:
Pulaski J. Bryan
by Geo. E. Waldo, Atty.

UNITED STATES PATENT OFFICE.

PULASKI J. BRYAN, OF CHICAGO, ILLINOIS, ASSIGNOR OF ONE-THIRD TO EDWARD W. RUSK, OF CALLAWAY, NEBRASKA, ONE-THIRD TO LOUIS A. BRYAN, OF GARY, INDIANA, AND ONE-THIRD TO GEORGE N. HARRIS, OF ADRIAN, MICHIGAN.

MEAT-CUTTING MACHINE.

1,130,664.   Specification of Letters Patent.   Patented Mar. 2, 1915.

Application filed June 23, 1911. Serial No. 634,937.

*To all whom it may concern:*

Be it known that I, PULASKI J. BRYAN, a citizen of the United States, and a resident of Chicago, in the county of Cook and State of Illinois, have invented certain new and useful Improvements in Meat-Cutting Machines, of which the following is a specification.

This invention relates to meat cutting machines, and relates particularly to meat cutting machines having rotary cutters.

The particular object of the invention is to provide a meat cutting machine of the type described, comprising devices for cutting or slicing both flesh and bone, whereby my improved machine is adapted for use in meat markets and other places for cutting or slicing steaks, ham, and other meats without first removing the bones therefrom.

A meat cutting machine of my invention comprises the various features, combinations of features and details of construction hereinafter described and claimed.

In the accompanying drawing, in which my invention is fully illustrated,—Figure 1 is a front view of a meat cutting machine of my invention. Fig. 2 is a side elevation thereof, partly in section. Fig. 3 is a top plan view thereof, partly in section. Fig. 4 is an enlarged fragmentary view illustrating the means for adjusting the travel of the conveyer table. Fig. 5 is an enlarged fragmentary detail view, illustrating the means for deflecting the severed meat from the disk cutter. Fig. 6 is an enlarged sectional view on the line 6—6 of Fig. 1; and Fig. 7 is an enlarged detail section on the line 7—7 of Fig. 3.

The cutting and sawing devices of my improved meat cutter are mounted, in a manner presently described, at the upper end of a standard 1, pivoted adjacent to its lower end to permit oscillating movement thereof to provide for imparting desired traverse or movement to the cutters. As shown, the lower end of said standard 1 is secured in a ring or sleeve 2, pivoted upon a shaft 3 rotatably mounted in suitable bearings formed in the upper ends of standards 4 and 5 secured in fixed upright position to the floor or other support. As shown, the standard 1 is secured in the sleeve 2 by means of a set screw 6.

For reasons presently apparent, the standard 1 is made hollow, the opening therein extending entirely through the same from end to end. Also, to provide for conveniently making attachments thereto, the upper end of said standard is preferably rectangular in shape.

Rotatably mounted on suitable bearings on opposite sides of the upper rectangular end of the standard 1, are arms 7 and 8. As shown, the bearings for said arms 7 and 8 are formed by bushings 9 and 10 secured to and projecting outwardly away from the opposite sides of said standard, said bushings being preferably secured to said standard by means of screw threaded extensions thereon which engage corresponding screw threaded extensions formed in said standard and said arms 7 and 8 being maintained in engagement with the bearings on said bushings by means of heads or collars 11 at the outer ends thereof. Said bushings 9 and 10 are preferably made of phosphor bronze, but may be made of any desired or approved material.

Extending laterally in the same directions from the outer ends of the arms 7 and 8, are hollow arms or sleeves 12 and 13, rotatably mounted in suitable bearings in which are shafts 14 and 15. One of said arms 7 and 8, as shown, the arm 7, is made considerably longer than the other, so that the lateral arm or sleeve 12 on said arm 7 will swing considerably outside of the lateral arm or sleeve 13 on the arm 8, so as to provide clearance between said arms and the various parts carried thereby.

In order to provide for adjusting the lengths of the arms 7 and 8, each of said arms preferably is made in two sections 16 and 17 slidable endwise relatively to each other and adapted to be secured together in any desired adjustment by means of bolts 18, the holes for said bolts in one of said sections being elongated or slotted, as shown at 19, to provide for desired endwise adjustment of said sections relative to each other.

Secured to rotate with the shaft 14 mounted in the arm 7, is a saw 20, and mounted to rotate with the shaft 15, mounted in the arm 8, is a disk cutter 21, the lengths of the hollow arms 12 and 13 on said arms 7 and 8 and of the shafts 14 and 15 being such that the saw 20 and disk cutter 21 will be positioned in the same plane.

Rotation is adapted to be imparted to the saw 20 and disk cutter 21 from a motor indicated at 22, suspended at the under side of arms 23 which project laterally from the ring or sleeve 2, preferably below the shaft 3, so that the weight of said motor will counterbalance the standard 1 and parts carried thereby and will maintain the same in upright position. As shown, said driving connections are as follows: Rotatably mounted in suitable bearings formed in the bushings 9 and 10, is a shaft 24 which is adapted to be driven from the motor 22 by means of a suitable belt adjusted to pulleys secured to the armature shaft of the motor and to the shaft 24, the sizes and positions of said pulleys being such that said driving belt will run inside of the hollow standard 1.

Secured to rotate with the shaft 24 at the outer ends of the bushings 9 and 10, are pulleys 25 and 26, and secured to the shafts 14 and 15 in line with said pulleys 25 and 26, respectively, are pulleys 27 and 28 adjusted to which, respectively, are driving belts 29 and 30, said pulleys being preferably grooved pulleys and the belts round in cross section.

When desired, the belts 29 and 30 may be tightened by loosening the bolts 18 which connect the sections 16 and 17 of the arms 7 and 8, drawing the sections 17 thereof which carry the shafts 14 and 15, respectively, outwardly, until said belts 29 and 30 are sufficiently tight, and in then again tightening said securing bolts 18. The pulley 25 is secured to the opposite end of the shaft 14 from that to which the saw 20 is secured, the end of said shaft projecting through and beyond the arm 7 at the opposite side of said arm from the hollow lateral arm 12 thereon. With this construction the hollow lateral arm 12 may be and is made in a single piece and integral with the arm 7. The pulley 26, however, is secured to the shaft 15 between the arm 8 and the disk cutter 21, thereby rendering it necessary, in order to provide for attaching said pulley 26 to the shaft 15, to make the arm 13 in two sections, the section thereof remote from the arm 8 being rigidly connected to and supported by a yoke 31 adapted to extend around the pulley 26, said arm 8, the sections of said hollow lateral arm 13, and the yoke 31 being preferably made integral with each other and forming but a single rigid piece.

To prevent persons from being cut by contact with the saw 20 and disk cutter 21, said saw and cutter are preferably protected by means of suitable guards, my invention contemplating the use of any desired or approved form of guard for this purpose. As shown, said guards are made of sheet metal bent to form spaced and rigidly connected segments 32 and 33 which inclose a portion of the cutting edges of said saw and disk cutter, respectively. As shown, also, the guard 32 for the saw 20 is carried by an arm or bracket 34 secured to the hollow lateral arm or sleeve 12, so that said guard will move with said saw 20 and will inclose the cutting edge thereof at all times. As shown, however, the guard 33 for the disk cutter 21, instead of moving with said disk cutter, is stationary, being mounted on a rigid arm or bracket 35, the lower end of which is secured to a bar 36 bolted or otherwise rigidly secured to the upper end of the standard 1. Said arm or bracket 35 extends down and is secured to said bar 36 directly in the rear of the arm 8. Said guard 33 will thus inclose the cutting edge of said disk cutter 21 only when said disk cutter is in fully raised inoperative position.

To prevent the accumulation of meat particles, grease, and the like, on the disk cutter 21, which would tend to cause it to stick in operation, I also preferably provide scrapers consisting of spring blades 37 secured to the arm or bracket 35 and which are adapted to closely embrace both sides of said disk cutter when in raised inoperative position, and to subject the same to a scraping action which will operate to remove therefrom all fine particles adhering thereto.

For convenience in operating the saw 20 and disk cutter 21, they are preferably provided with suitable handles consisting, as shown, of hand grips 38 and 39 secured in sleeves 40 and 41 rotatably mounted on suitable bearings on the hollow lateral arms 12 and 13, respectively. As shown, said sleeves 40 and 41 are maintained in position on their bearings on said arms 12 and 13, and rotation thereof relatively to said arms is limited by means of pins 42 secured in said arms 12 and 13 and which project into circumferential slots 43 formed in said sleeves 40 and 41.

Depression of the arm 7 which carries the saw 20 relatively to the standard 1, is limited by means of a stop 44 on the upper end of said standard which projects laterally into the path of travel of said arm 7 as it is swung downward and forward, and depression of the arm 8 which carries the disk cutter 21 is limited by means of a chain or the like 45, which connects said arm 8 with a rigid part of the machine frame, as shown, with the arm or bracket 35.

As shown, the bar 36 secured to the upper end of the standard 1 is extended laterally both ways from said standard and the ends thereof are bent forwardly substantially at right angles so as to embrace the outer faces of the pulleys 25 and 26, and are provided with suitable bearings for the outer ends of the shaft 24. Said shaft 24 is secured in position against endwise movement by means of suitable collars 46 secured thereto outside of the bearings therefor in the forwardly projecting ends of said bar 36.

In the operation of the machine the meat to be cut is supported upon a suitable table comprising a fixed frame, a carrier in the form of an endless conveyer, and means for imparting step by step movement to said support or conveyer. As shown, the frame of said supporting table consists of side frame sections comprising upright standards 47, the lower ends of which are adapted to rest upon the floor or other support, and the upper ends of which are rigidly connected by longitudinal frame members 48 and 49. Said side frame sections are preferably made of cast iron and the members 47, 48 and 49 of each frame section are cast integral with each other, preferably in the form of channels disposed with their open sides inwardly. The frame sections at opposite sides of the machine are rigidly connected by suitable transverse frame members 50 and 51. The member 50 preferably consists of an angle bar the ends of which are rigidly connected to flanges of the front upright frame members 47 adjacent to their lower ends, being disposed with one of its flat sides on top to form a support for certain operative parts, as presently described. The transverse frame members 51 preferably consist of tie rods inserted over which are sections of pipe the ends of which are adapted to abut against the inner surfaces of the upright frame member 47, said pipe sections being made of proper length to space said frame members desired distances apart.

The conveyer table, designated as a whole by B, consists of channels bars 52 the ends of which are rigidly connected to chain belts 53 adjusted to sprocket wheels 54 secured to rotate with a shaft 55 rotatably mounted in suitable bearings at the front ends of the stationary side frame sections, and to other sprocket wheels, not shown, similarly mounted at the rear ends of said side frame sections, said channel bars being so positioned that the flat sides of the channel bars which form the upper lap of said conveyer or table, will be on top. The chain belts 53 run in the channels of the upper longitudinal frame members 48, so that the ends of the channel bars 52 will be supported by the lower flanges of said longitudinal frame members 48, which will thus prevent sagging of the conveyer table. Suitable means are also provided for imparting a step by step feed to the conveyer table B, my invention contemplating the use of any desired or approved means for this purpose, said means being preferably so constructed that the feed of said conveyer table will admit of fine adjustment. As shown, the means for feeding said conveyer table B are as follows: Secured to rotate with the shaft 55, is a wheel or pulley 56, the face of which is substantially straight. Pivoted to the shaft 55, one at each side of said wheel or pulley 56, are arms 57 pivoted between the outer ends of which is a dog or pawl 58, said arms 57 and dog or pawl 58 forming in effect a toggle joint and the relation being such that when said toggle is straightened by pivotal movement of the dog or pawl 58, the inner end of said dog or pawl will be brought into contact with the face of the wheel or pulley 56 and will engage the same with a strong frictional engagement, so that continued pivotal movement of said dog or pawl 58 with the arms 57 will operate to rotate said wheel or pulley 56 and thus to impart desired feeding movement to the conveyer table B. As shown, desired pivotal movement to rotate the wheel or pulley 56 in the manner described, is adapted to be imparted to said dog or pawl 58 by means of a foot lever 59 pivoted between its ends to a stud 60 which projects laterally from one of the upright frame members 47, the outer end of said stud being supported by a bracket 61. The rear end of the foot lever 59 is pivotally connected with the outer end of the dog or pawl 58 by a rod 62, while the front end of said lever 59 is adapted to be engaged by the foot of the operator, for the purpose of imparting desired pivotal movement to said lever.

With the described construction, it is obvious that depressing the front end of the lever 59 will operate to impart desired pivotal movement to the dog or pawl 58 to cause it to engage the face of the wheel 56 and to turn the same a distance corresponding to the angular movement of the lever 59.

As shown, the means for adjusting or regulating the feed of the conveyer table B is as follows:—Secured in fixed position to the machine frame, is a yoke 63 through which the pawl or dog 58 extends. The upper side of said yoke 63 forms a fixed stop which limits the upward pivotal movement of said pawl 58. The downward pivotal movement of said dog or pawl 58 is limited and controlled by a pin 64 secured in and which projects laterally from a slide 65 into the path of travel of said dog or pawl as its outer end is depressed, said slide being provided with suitable guide surfaces which are adapted to slidably engage the outer member of said yoke 63, so that said slide 65 will be movable up and down on said outer yoke member. To provide for securing said slide 65 in different positions on said yoke, and thus for varying the position of the stop pin 64, notches 66 are formed in opposite edges of the member of said yoke 63 to which said slide 65 is fitted, the notches in opposite edges of said yoke being preferably staggered, and being preferably spaced short distances apart—say one-eighth of an inch. Thus, with the staggered relation of said notches, provision is made for varying the adjustment of said slide 65 by one-sixteenth of an inch, in the manner now to be described. The notches 66 are adapted to be engaged by pawls 67 pivoted at 68 adjacent to opposite edges of said slide 65. The lower ends of said pawls 67 are respectively adapted to engage the notches 66 in opposite edges of said yoke member. Above their pivotal points 68, said pawls 67 are offset, as shown at 69, and project laterally through slots or openings 70 formed in said slide. The upper ends of said pawls 67 form finger grips adapted for grasping said pawls for the purpose of moving the same pivotally to disengage their lower ends from the notches 66, a spring 71 being inserted between said pawls above their pivotal points, which will operate to throw the lower ends thereof inwardly to engage the notches 66. The lower ends of said pawls can be disengaged from said notches 66 by pressing the upper ends thereof together against the force of said spring 71.

With the described construction, it is obvious that the pivotal movement of the dog or pawl 58 may be varied as desired, by properly adjusting the position of the slide 65 which controls the position of the stop pin 64.

The conveyer table B terminates short of the plane in which the saw 20 and disk cutter 21 are located, so that during the cutting operation, the meat will overhang said conveyer table B and to support the same during the cutting operation, an auxiliary support is provided. As shown, said auxiliary support, designated, as a whole, by C, consists of strips of wood 72 secured in spaced parallel positions at the upper ends of brackets 73 preferably made of suitable sheet metal, said brackets being provided with vertical slots or openings 74 which form continuations of the slot or space 75 between the wood strips 72 which are adapted to receive the saw 20 and disk cutter 21 in the operation of the machine. In the preferable construction shown, said auxiliary support C is supported so as to be vertically movable, its normal position being such that the tops of the wood strips 72 will be below the level of the upper lap of the conveyer table B, and said auxiliary support being adapted to be raised to the level of said conveyer table B by suitable mechanism provided for the purpose during the cutting operation. As shown, said auxiliary support C is supported by links 76 and 77 pivotally connected to the brackets 73 at points spaced vertically one above the other, the opposite ends of the links 76 being pivoted to the longitudinal frame member 49 and the opposite ends of the links 77 being pivoted to brackets 78 on the upright frame members 47. The weight of said auxiliary support C will operate to maintain the same normally in depressed or lowered position and it is adapted to be raised by means of a foot lever 79 pivoted between its ends to a support or bracket 80 mounted on the transverse frame member 50, the rear end of which is connected with the links 76 by rods or bars 81. The front end of said lever 79 is adapted to be depressed by the foot of the operator, which, with the described construction and relation, will operate in an obvious manner to elevate said auxiliary support C.

When a slice of meat has been severed from the main portion resting on the conveyer table B, it falls upon a shelf or support 82 supported upon the machine frame below the auxiliary support C.

My improved machine also preferably comprises means for preventing lateral displacement of the main body of meat on the conveyer table B under the action of the saw 20 and disk cutter 21 in the operation of the machine. One means for this purpose consist of a stop 83 on the auxiliary support C against which the main body of meat is adapted to rest, said stop 83 being preferably secured in position by pins 84 thereon which are interchangeable in suitable holes formed lengthwise in one of the wood strips 72, as shown, the inner strip. Other means for this purpose comprises star wheels 85 rotatably mounted on studs which project laterally from the ends of arms 86 formed on sleeves 87 rotatably mounted on rods or bars 88 the outer ends of which are pivoted between the upper ends of standards or brackets 89 mounted on the upper longitudinal frame members 48 at opposite sides of the machine. Each of said rods 88 extends short of the center of the machine and said rods, together with the star wheels 85 and related parts, are adapted to be turned pivotally upwardly and outwardly so as not to obstruct the conveyer table B when placing the meat thereon.

The sleeves 87 at their outer or free ends of the rods 88 are secured to said rods against turning by set screws 90. The other sleeves 87 are secured to said rods 88 so as to provide for limited turning thereof from positions in which the star wheels 85 carried thereby will just clear the top of the conveyer table B, to raised positions which will permit the body of meat on the conveyer table to pass under the same. As shown, the means for thus securing said inner sleeves to the rods 88 consists of pins 91 secured in said rods which extend through circumferential slots 92 formed in said sleeves.

To prevent the severed slices of meat from adhering to the disk cutter 21 during the operation of severing the same, a separating device is preferably provided in connection with said disk cutter, adapted for guiding or throwing said slices away from said disk cutter as said cutter enters. As shown, said separating device consists of a plate 93 carried by the sleeve 41 mounted on the arm 13 which carries said disk cutter. Said plate may be described as generally similar in shape to the share of a plow, the lower side of said share extending almost into contact with the outer side of said disk cutter and diverging upwardly away therefrom.

The arms 12 and 13 are maintained yieldingly in raised inoperative positions by suitable means consisting, as shown, of coiled springs 94 and 95, anchored at one end to said arms, respectively, and at their other ends to pins secured in the heads 11 on the bushings 9 and 10 on which said arms are rotatably mounted, and which surround the bearing hubs of said arms. My invention, however, contemplates any other desired or approved means for this purpose.

I claim:

1. In a meat cutting machine, the combination of a pivoted standard, separate arms of different length independently pivoted to said standard, lateral projections on said arms, shafts rotatably mounted in said lateral projections, a circular saw secured to rotate with one of said shafts, a disk cutter secured to rotate with the other of said shafts, and means for rotating said shafts, substantially as described.

2. In a meat cutting machine, the combination of a pivoted standard, separate arms of different length independently pivoted to said standard, lateral projections on said arms, shafts rotatably mounted in said lateral projections, a circular saw secured to rotate with one of said shafts, a disk cutter secured to rotate with the other of said shafts, and means for rotating said shafts, said means comprising a motor mounted on said standard, and driving connections between said motor and said saw and cutter shafts, substantially as described.

3. In a meat cutting machine, the combination of a pivoted standard, separate arms of different length independently pivoted to said standard, lateral projections on said arms, shafts rotatably mounted in said lateral projections, a circular saw secured to rotate with one of said shafts, a disk cutter secured to rotate with the other of said shafts, means for rotating said shafts, said means comprising a motor mounted on said standard, a shaft rotatably mounted in said standard as aforesaid, driving connections between the shaft of said motor and said shaft mounted in said standard and between said shaft and the saw and the disk cutter shafts, substantially as described.

4. In a meat cutting machine, the combination of a pivoted standard, separate arms of different length independently pivoted to said standard, lateral projections on said arms, shafts rotatably mounted in said lateral projections, a circular saw secured to rotate with one of said shafts, a disk cutter secured to rotate with the other of said shafts, and means for rotating said shafts, said means comprising a motor mounted on said standard, a shaft rotatably mounted in said standard concentric with the pivots of the arms pivoted to said standard as aforesaid, and driving connections between the shaft of said motor and said shaft mounted in said standard and between said saw and the disk cutter shafts, substantially as described.

5. In a meat cutting machine, the combination of a pivoted standard, bosses on opposite sides of said standard adjacent to its upper end, separate arms of different length independently pivoted to said bosses, lateral projections on said arms, shafts rotatably mounted in said lateral projections, a circular saw secured to rotate with one of said shafts, a disk cutter secured to rotate with the other thereof, a shaft rotatably mounted in said bosses, driving connections between said shaft and the saw and disk cutter shafts, said connections comprising pulleys secured to rotate with said shafts, respectively, and belts adjusted to said pulleys, a motor mounted on said pivoted standard and driving connection between the motor shaft and said shaft mounted in said standard, substantially as described.

6. In a meat cutting machine, the combination of a pivoted standard, bosses on opposite sides of said standard adjacent to its upper end, separate arms of different length independently pivoted to said bosses, lateral projections on said arms, shafts rotatably mounted in said lateral projections, a circular saw secured to rotate with one of said shafts, a disk cutter secured to rotate with the other thereof, a shaft rotatably mounted in said bosses, driving connections between said shaft and the saw and disk cutter shafts, said connections comprising pulleys secured to rotate with said shafts, respectively, the pulleys on said shaft mounted in the bosses on said standard being secured thereto outside of said bosses, and belts adjusted to said pulleys, a motor mounted on said pivoted standard and driving connections between the motor shaft and said shaft mounted in said standard, substantially as described.

7. In a meat cutting machine, the combination of a pivoted standard, bosses on opposite sides of said standard adjacent to its upper end, separate arms of different length independently pivoted to said bosses, said arms being constructed and arranged to be adjustable lengthwise, lateral projections on said arms, shafts rotatably mounted in said lateral projections, a circular saw secured to rotate with one of said shafts, a disk cutter secured to rotate with the other thereof, a shaft rotatably mounted in the bosses in said standard, driving connections between said shafts and the saw and disk cutter shafts, said connections comprising pulleys secured to rotate with said shafts, respectively, and belts adjusted to said pulleys, a motor mounted on said pivoted standard and driving connection between the motor shaft and said shaft mounted in said standard, substantially as described.

8. In a meat cutting machine, the combination of a pivoted standard, bosses on opposite sides of said standard adjacent to its upper end, separate arms of different length independently pivoted to said bosses, lateral projections on said arms, shafts rotatably mounted in said lateral projections, a saw secured to rotate with one of said shafts, and a disk cutter secured to rotate with the other thereof, a shaft rotatably mounted in said bosses, driving connections between said shaft and the saw and disk cutter shafts, said connections comprising pulleys secured to rotate with said shafts, respectively, and belts adjusted to said pulleys, a motor mounted on said standard below its pivotal point, whereby said motor will operate to counterbalance said standard, and driving connection between the motor shaft and said shaft mounted in said standard, substantially as described.

9. In a meat cutting machine, the combination of a hollow standard pivoted adjacent its lower end, separate arms of different length independently pivoted to said standard adjacent to its upper end, lateral projections on said arms, shafts rotatably mounted in said lateral projections, a saw secured to rotate with one of said shafts and a disk cutter secured to rotate with the other thereof, a motor mounted on said standard below its pivotal point, whereby the weight of the motor will counterbalance said standard, and driving connection between the shaft of said motor and said saw and disk cutter shafts, said driving connection comprising a shaft rotatably mounted in said standard adjacent to the pivots of the arms pivoted thereto as aforesaid, pulleys secured to said shaft and to the motor shaft, respectively, and a belt adjusted to said pulleys, the relation being such that the belt will run inside of said hollow standard, substantially as described.

10. In a meat cutting machine, the combination of a pivoted standard, an arm pivoted on said standard, meat cutting mechanism mounted on said arm, a motor mounted on said standard and forming a counterbalance therefor, and driving connections between said motor and said meat cutting mechanism, substantially as described.

11. In a meat cutting machine, the combination of a pivoted standard, separate arms of different lengths independently pivoted on said standard, lateral projections on said arms, shafts rotatably mounted in said lateral projections, a circular saw secured to rotate with one of said shafts, and a disk cutter with the other, and means for counterbalancing said standard, substantially as described.

12. In a meat cutting machine, the combination of a pivoted standard, separate arms of different lengths independently pivoted on said standard, lateral projections on said arms, shafts rotatably mounted in said lateral projections, a circular saw secured to rotate with one of said shafts, and a disk cutter with the other, a motor mounted on said standard and forming a counterbalance therefor, and driving connection between said motor and cutter shafts, substantially as described.

13. In a meat cutting machine, the combination of a pivoted standard, arms of different length pivoted to said standard, lateral projections on said arms, shafts rotatably mounted in said lateral projections, a saw secured to rotate with one of said shafts, and a disk cutter secured to rotate with the other thereof, means for rotating said saw and disk cutter shafts, and handles for operating the arms pivoted to said standards as aforesaid, said handles comprising sleeves rotatably mounted on suitable bearings on the lateral projections on said arms, and hand grips on said sleeves, substantially as described.

14. In a meat cutting machine, the combination of a pivoted standard, arms of different length pivoted to said standard, lateral projections on said arms, shafts rotatably mounted in said lateral projections, a saw secured to rotate with one of said shafts and a disk cutter secured to rotate with the other thereof, means for rotating said saw and disk cutter shafts, handles for operating the arms pivoted to said standards, as aforesaid, said handles comprising sleeves rotatably mounted on suitable bearings on the lateral projections of said arms, respectively, hand grips on said handles, and means for limiting the rotation of said handles, said means comprising pins secured in the lateral projections on said arms which extend into circumferential slots formed in the sleeve portions of said handles, substantially as described.

In testimony, that I claim the foregoing as my invention, I affix my signature in presence of two subscribing witnesses this 17th day of June, A. D. 1911.

PULASKI J. BRYAN.

Witnesses:
K. A. COSTELLO,
M. WILDNER.